(12) United States Patent
Liang

(10) Patent No.: US 10,675,912 B1
(45) Date of Patent: Jun. 9, 2020

(54) MOVEABLE CARRIER AND OMNIDIRECTIONAL WHEEL THEREOF

(71) Applicant: Wistron Corp., New Taipei (TW)

(72) Inventor: Chen Yi Liang, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/412,207

(22) Filed: May 14, 2019

(30) Foreign Application Priority Data

Jan. 17, 2019 (TW) .............................. 108101737 A

(51) Int. Cl.
*B62B 3/00* (2006.01)
*B60B 19/00* (2006.01)
*B60B 19/12* (2006.01)
*A61H 3/04* (2006.01)

(52) U.S. Cl.
CPC ............ *B60B 19/003* (2013.01); *A61H 3/04* (2013.01); *B60B 19/12* (2013.01); *B62B 3/00* (2013.01); *B60B 2200/43* (2013.01); *B60B 2200/47* (2013.01); *B62B 2301/254* (2013.01)

(58) Field of Classification Search
CPC ...... B60B 19/003; B60B 19/12; B60B 19/125
See application file for complete search history.

(56) References Cited

U.S. PATENT DOCUMENTS

| | | | | |
|---|---|---|---|---|
| 4,223,900 A * | 9/1980 | Olivieri | ..................... | A63C 1/32 280/11.12 |
| 5,720,529 A * | 2/1998 | Barron | ................... | A63C 17/24 301/5.23 |
| 6,315,109 B1 * | 11/2001 | Dean | ......................... | B60P 1/02 193/35 MD |
| 6,547,340 B2 * | 4/2003 | Harris | .................... | B60B 19/003 180/20 |
| 7,621,355 B2 * | 11/2009 | Chu | ....................... | B60B 19/003 180/7.2 |
| 7,980,335 B2 * | 7/2011 | Potter | .................... | B60B 19/003 180/7.1 |
| 8,011,735 B2 * | 9/2011 | Scogna | ................. | B60B 19/003 301/5.23 |

(Continued)

FOREIGN PATENT DOCUMENTS

| CN | 202213648 U | 5/2012 |
|---|---|---|
| CN | 103129310 A | 6/2013 |

(Continued)

*Primary Examiner* — John D Walters
*Assistant Examiner* — James J Triggs

(57) ABSTRACT

An omnidirectional wheel is provided. The omnidirectional wheel includes a plurality of major brackets, a plurality of minor brackets, a plurality of major wheels and a plurality of minor wheels. The major brackets include a first major bracket. The minor brackets include a first minor bracket. The major wheels include a first major wheel, wherein the major wheels are connected to the respective major brackets, the first major wheel is connected to the first major bracket, the first major wheel is rotatable around a first axis, and the first major bracket extends in a first extending direction. The minor wheels include a first minor wheel, wherein the minor wheels are connected to the respective minor brackets, the first minor wheel is connected to the first minor bracket, the first minor wheel is rotatable around a second axis, and the first minor bracket extends in a second extending direction.

15 Claims, 7 Drawing Sheets

(56) References Cited

U.S. PATENT DOCUMENTS 8,758,191 B2    6/2014  Takenaka et al.
2008/0000749 A1* 1/2008  Li ........................ B60B 19/003
                                                  193/35 MD

FOREIGN PATENT DOCUMENTS

| CN | 207902015 U | 9/2018 |
| JP | 2010-006352 A1 | 1/2010 |
| TW | M327803 U | 3/2008 |
| TW | M572837 U | 1/2019 |
| WO | WO 2010/064408 A1 | 6/2010 |

* cited by examiner

US 10,675,912 B1

MOVEABLE CARRIER AND OMNIDIRECTIONAL WHEEL THEREOF

CROSS REFERENCE TO RELATED APPLICATIONS

This Application claims priority of Taiwan Patent Application No. 108101737, filed on Jan. 17, 2019, the entirety of which is incorporated by reference herein.

BACKGROUND OF THE INVENTION

Field of the Invention

The present invention relates to an omnidirectional wheel, and in particular to an omnidirectional wheel with a plurality of major wheels and a plurality of minor wheels.

Description of the Related Art

A conventional omnidirectional wheel includes a plurality of major wheels and a plurality of minor wheels. The major wheels and the minor wheels are arranged in a staggered manner. Since the size of the major wheels is greater than the size of the minor wheels, the rolling frequency of the minor wheels is much higher than the rolling frequency of the major wheels, and they can become worn after long-term use. Therefore, the minor wheels become damaged before the major wheels are damaged. Conventionally, the whole omnidirectional wheel is commonly replaced, even when the major wheels are still intact.

BRIEF SUMMARY OF THE INVENTION

In one embodiment, an omnidirectional wheel is provided. The omnidirectional wheel includes a plurality of major brackets, a plurality of minor brackets, a plurality of major wheels and a plurality of minor wheels. The major brackets include a first major bracket. The minor brackets include a first minor bracket, wherein the major brackets and the minor brackets are arranged in a staggered manner around the axis of the omnidirectional wheel. The major wheels include a first major wheel, wherein the major wheels are connected to the respective major brackets, the first major wheel is connected to the first major bracket, the first major wheel is rotatable around a first axis, the first major bracket extends in a first extending direction, the first extending direction passes through the omnidirectional wheel axis, and the first axis is orthogonal to the first extending direction. The minor wheels include a first minor wheel, wherein the minor wheels are connected to the respective minor brackets, the first minor wheel is connected to the first minor bracket, the first minor wheel is rotatable around a second axis, the first minor bracket extends in a second extending direction, the second extending direction passes through the omnidirectional wheel axis, and the second axis is not orthogonal to the second extending direction.

In one embodiment, a moveable carrier is provided. The moveable carrier includes a carrier body and a plurality of omnidirectional wheels connected to the carrier body. Each omnidirectional wheel includes a plurality of major brackets, a plurality of minor brackets, a plurality of major wheels and a plurality of minor wheels. The major brackets include a first major bracket. The minor brackets include a first minor bracket, wherein the major brackets and the minor brackets are arranged in a staggered manner around the omnidirectional wheel axis. The major wheels include a first major wheel, wherein the major wheels are connected to the respective major brackets, the first major wheel is connected to the first major bracket, the first major wheel is rotatable around a first axis, the first major bracket extends in a first extending direction, the first extending direction passes through the omnidirectional wheel axis, and the first axis is orthogonal to the first extending direction. The minor wheels include a first minor wheel, wherein the minor wheels are connected to the respective minor brackets, the first minor wheel is connected to the first minor bracket, the first minor wheel is rotatable around a second axis, the first minor bracket extends in a second extending direction, the second extending direction passes through the omnidirectional wheel axis, and the second axis is not orthogonal to the second extending direction.

Utilizing the omnidirectional wheel of the embodiment of the invention, the first axis is orthogonal to the first extending direction, and the second axis is not orthogonal to the second extending direction. Therefore, the lateral force which rotates the minor wheels is increased, and the contact time between the minor wheels and the ground is decreased. In other words, the abrasion of the minor wheels is reduced, and the product lifespan of the minor wheels is increased. The difference in the product lifespan between the major wheels and the minor wheels is decreased.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
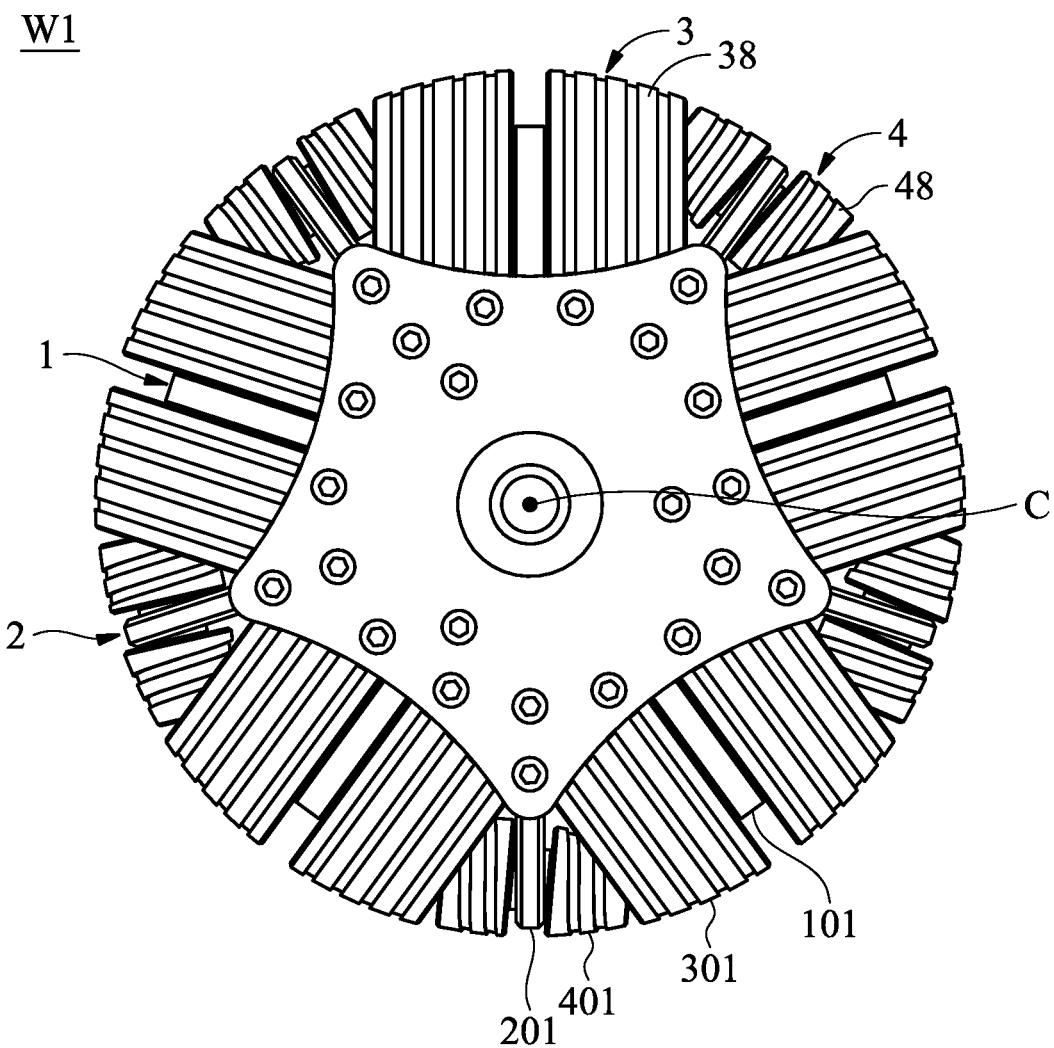
FIG. 1 shows an omnidirectional wheel of a first embodiment of the invention.

FIG. 1 shows an omnidirectional wheel W1 of a first embodiment of the invention. With reference to FIG. 1, the omnidirectional wheel W1 of the embodiment of the invention includes a plurality of major brackets 1, a plurality of minor brackets 2, a plurality of major wheels 3 and a plurality of minor wheels 4. The major brackets 1 include a first major bracket 101. The minor brackets 2 include a first minor bracket 201. The major brackets 1 and the minor brackets 2 are arranged in a staggered manner around the omnidirectional wheel axis C of the omnidirectional wheel. The major wheels 3 include a first major wheel 301. The major wheels 3 are connected to the respective major brackets 1. The first major wheel 301 is connected to the first major bracket 101. The minor wheels 4 include a first minor wheel 401, wherein the minor wheels 4 are connected to the respective minor brackets 2, and the first minor wheel 401 is connected to the first minor bracket 201.

Figure 2:
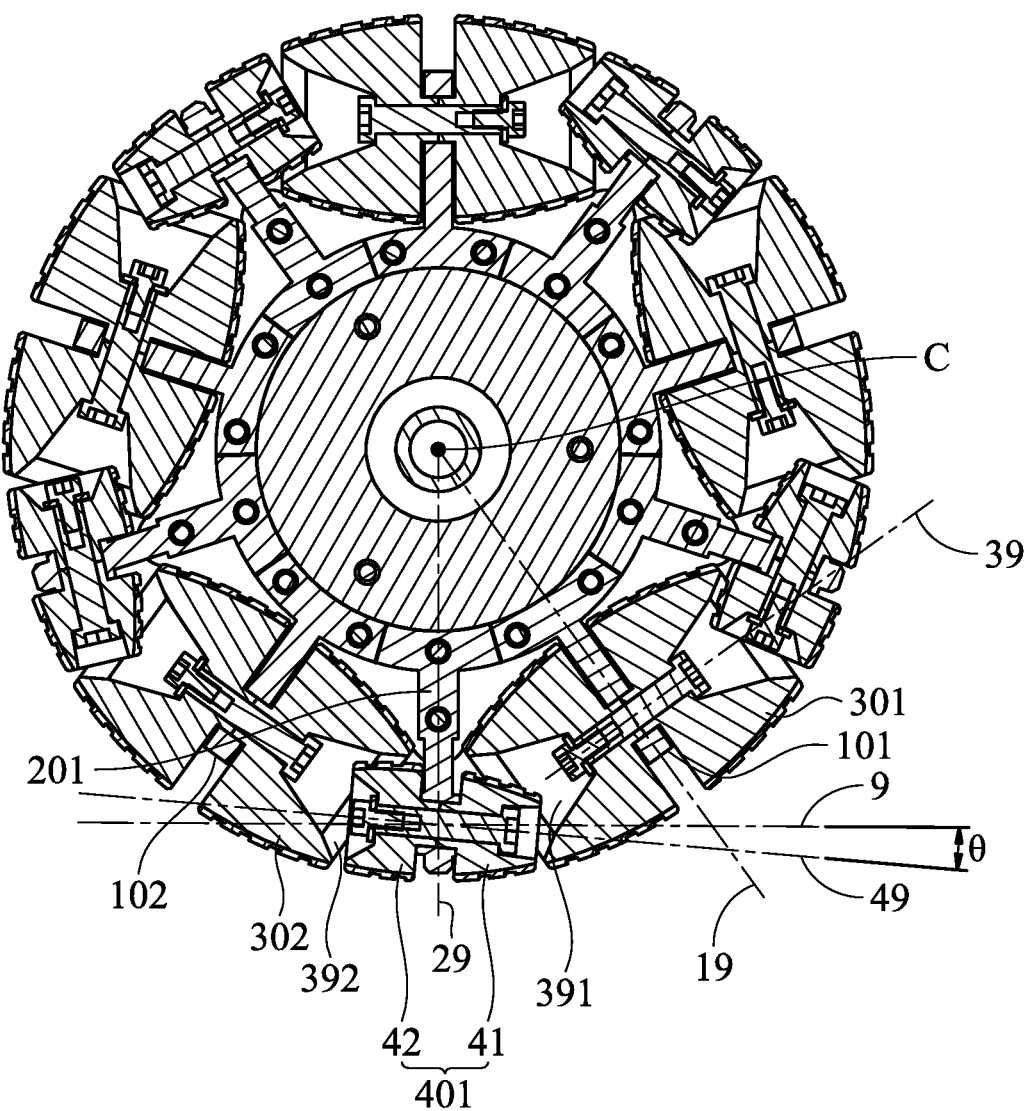
FIG. 2 is a sectional view of the omnidirectional wheel of the embodiment of the invention.

FIG. 2 is a sectional view of the omnidirectional wheel W1 of the embodiment of the invention. With reference to FIG. 2, the first major wheel 301 is rotatable around a first axis 39. The first major bracket 101 extends in a first extending direction 19. The first extending direction 19 passes through the omnidirectional wheel axis C. The first axis 39 is orthogonal to the first extending direction 19. The first minor wheel 401 is rotatable around a second axis 49. The first minor bracket 201 extends in a second extending direction 29. The second extending direction 29 passes through the omnidirectional wheel axis C. The second axis 49 is not orthogonal to the second extending direction 29.

With reference to FIG. 2, in one embodiment, a base line 9 is orthogonal to the second extending direction 29, and an included angle 9 between the base line 9 and the second axis 49 is between 1 degree and 10 degrees. In one embodiment, the included angle 9 between the base line 9 and the second axis 49 is between 4 degrees and 6 degrees. In one embodiment, the included angle 9 between the base line 9 and the second axis 49 can be 5 degrees.

Utilizing the omnidirectional wheel of the embodiment of the invention, the first axis 39 is orthogonal to the first extending direction 19, and the second axis 49 is not orthogonal to the second extending direction 29. Therefore, the lateral force which rotates the minor wheels 4 is increased, and the contact time between the minor wheels 4 and the ground is decreased. In other words, the abrasion of the minor wheels 4 is reduced, and the product lifespan of the minor wheels 4 is increased. The difference in the product lifespan between the major wheels 3 and the minor wheels 4 is decreased.

Figure 3A:
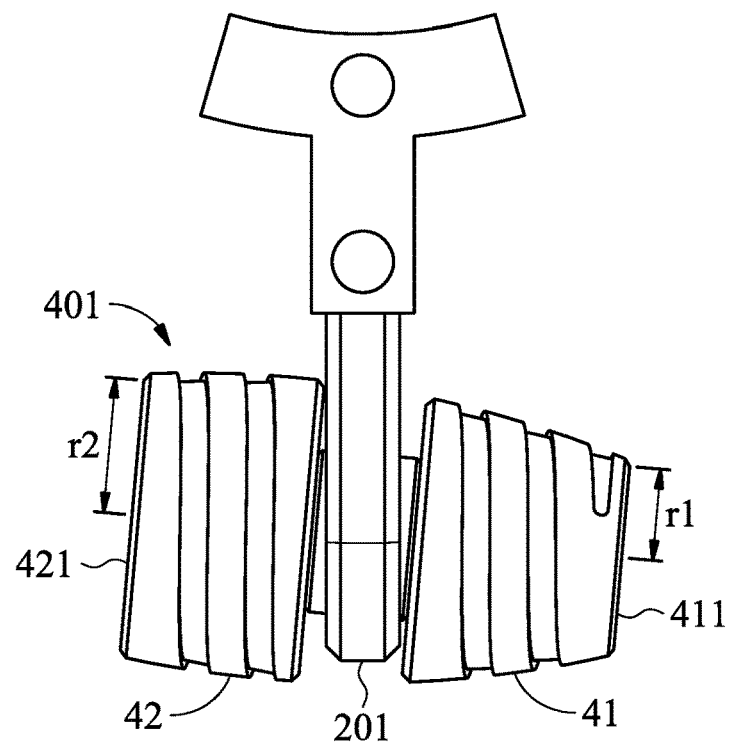
FIG. 3A shows the details of the first minor wheel of the embodiment of the invention.
Figure 3B:
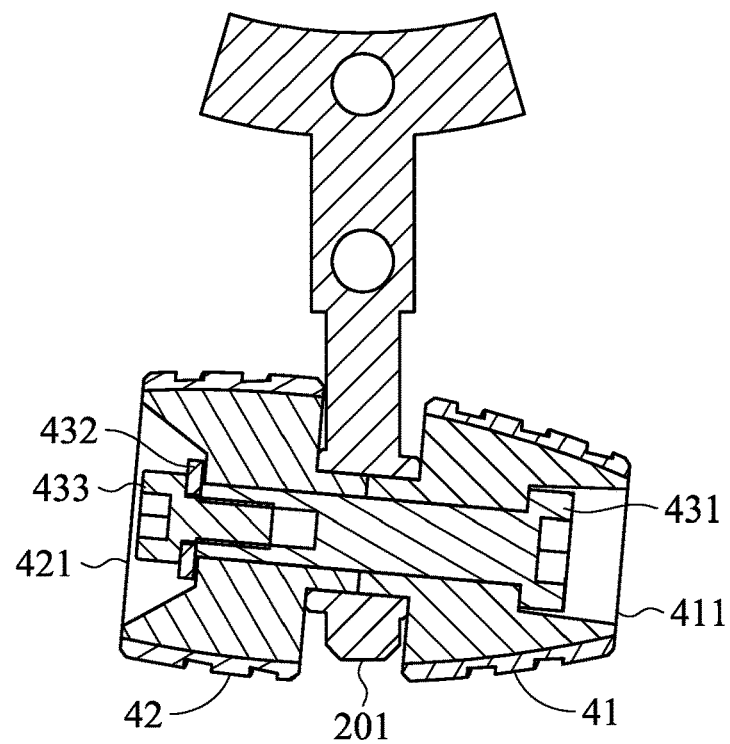
FIG. 3B is a sectional view of the first minor wheel of the first embodiment of the invention.

FIG. 3A shows the details of the first minor wheel 401 of the embodiment of the invention. FIG. 3B is a sectional view of the first minor wheel 401 of the first embodiment of the invention. With reference to FIG. 3A, in one embodiment, the first minor wheel 401 includes a first minor wheel section 41 and a second minor wheel section 42. The first minor wheel section 41 is located on one side of the first minor bracket 201, and the second minor wheel section 42 is located on the other end of the first minor bracket 201. The shape of the first minor wheel section 41 differs from the shape of the second minor wheel section 42.

With reference to FIG. 3B, in one embodiment, the first minor wheel section 41 includes a first minor wheel section minimum end 411, and the second minor wheel section 42 includes a second minor wheel section minimum end 421. The first minor wheel section minimum end 411 includes a first end radius r1, and the second minor wheel section minimum end 421 includes a second end radius r2. The first end radius r1 is smaller than the second end radius r2.

With reference to FIGS. 3A and 3B, in one embodiment, the second minor wheel section minimum end 421 is closer to the omnidirectional wheel axis C relative to the first minor wheel section minimum end 411.

Figure 3C:
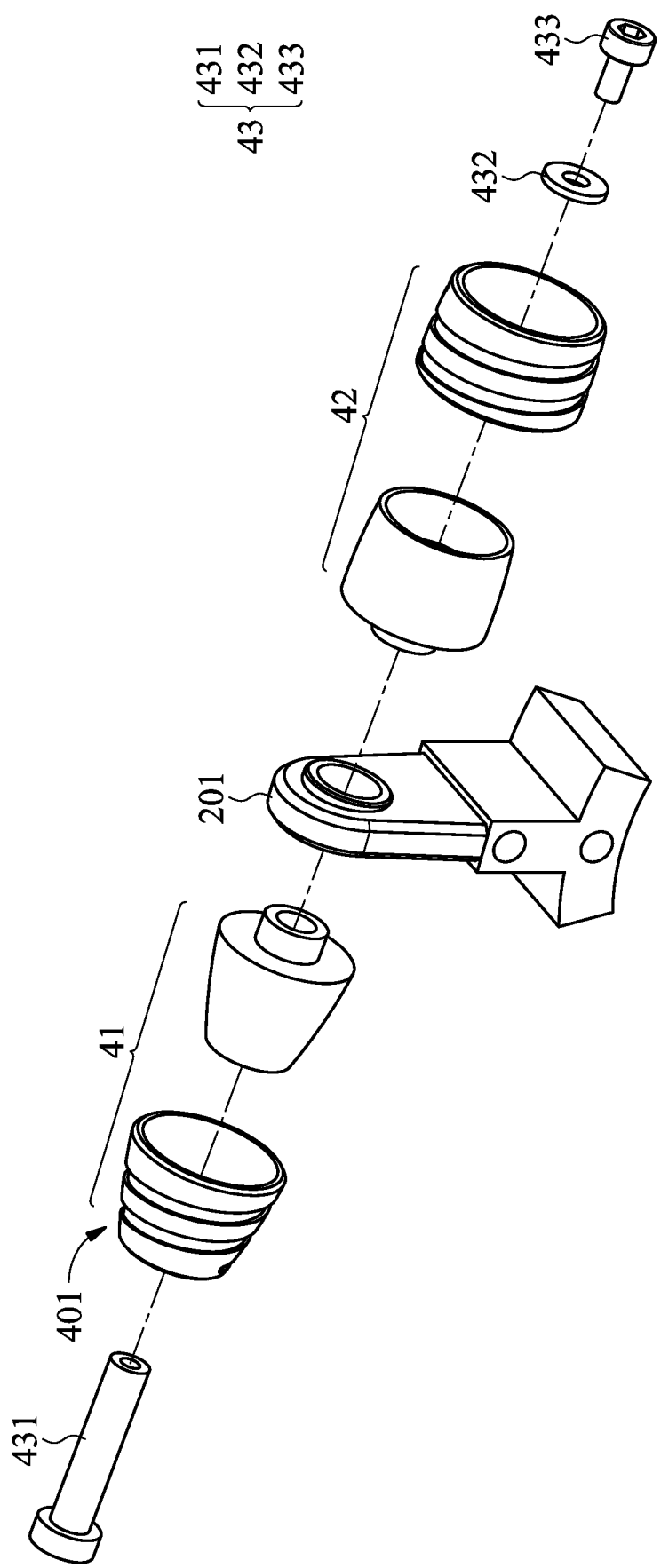
FIG. 3C is an exploded view of the first minor wheel of the embodiment of the invention.

FIG. 3C is an exploded view of the first minor wheel of the embodiment of the invention. With reference to FIG. 3C, in one embodiment, the first minor wheel 401 further includes a first shaft 43, and the first minor wheel section 41 and the second minor wheel section 42 pivot on the first minor bracket 201 via the first shaft 43.

With reference to FIG. 3C, in one embodiment, the first shaft 43 includes a screw seat 431, a gasket 432 and a bolt 433. The screw seat 431 passes through the first minor wheel section 41, the first minor bracket 201 and the second minor wheel section 42. The bolt 433 passes through the gasket 432 and the second minor wheel section 42 to be affixed to the screw seat 431. In one embodiment, the gasket of the first shaft 43 can be omitted. The disclosure is not meant to restrict the invention.

With reference to FIG. 2, in one embodiment, the major wheels 3 include a second major wheel 302. The major brackets 1 include a second major bracket 102. The second major wheel 302 is connected to the second major bracket 102. The first major wheel 301 includes a first recess 391. The second major wheel 302 includes a second recess 392. A portion of the first minor wheel section 41 is located in the first recess 391, and a portion of the second minor wheel section 42 is located in the second recess 392.

With reference to FIG. 1, in one embodiment, each major wheel 3 has major wheel treads 38 formed on the surface of the major wheel 3, and each minor wheel 4 has minor wheel treads 48 formed on the surface of the minor wheel 4. In one embodiment, the major wheel treads 38 are annular grooves, and the minor wheel treads 48 are spiral grooves. The design for the major wheel treads 38 that uses annular grooves decreases the lateral force applied to the major wheels 3, and increases the contact time between the major wheels 3 and the ground. The design for the minor wheel treads 48 that uses spiral grooves increases the lateral force applied to the minor wheel 4, and decreases the contact time between the minor wheel 4 and the ground. The abrasion of the minor wheels 4 is reduced, and the product lifespan of the minor wheels 4 is increased.

In one embodiment, the major wheel treads 38 and the minor wheel treads 48 can be made of rubber or another material.

Figure 4:
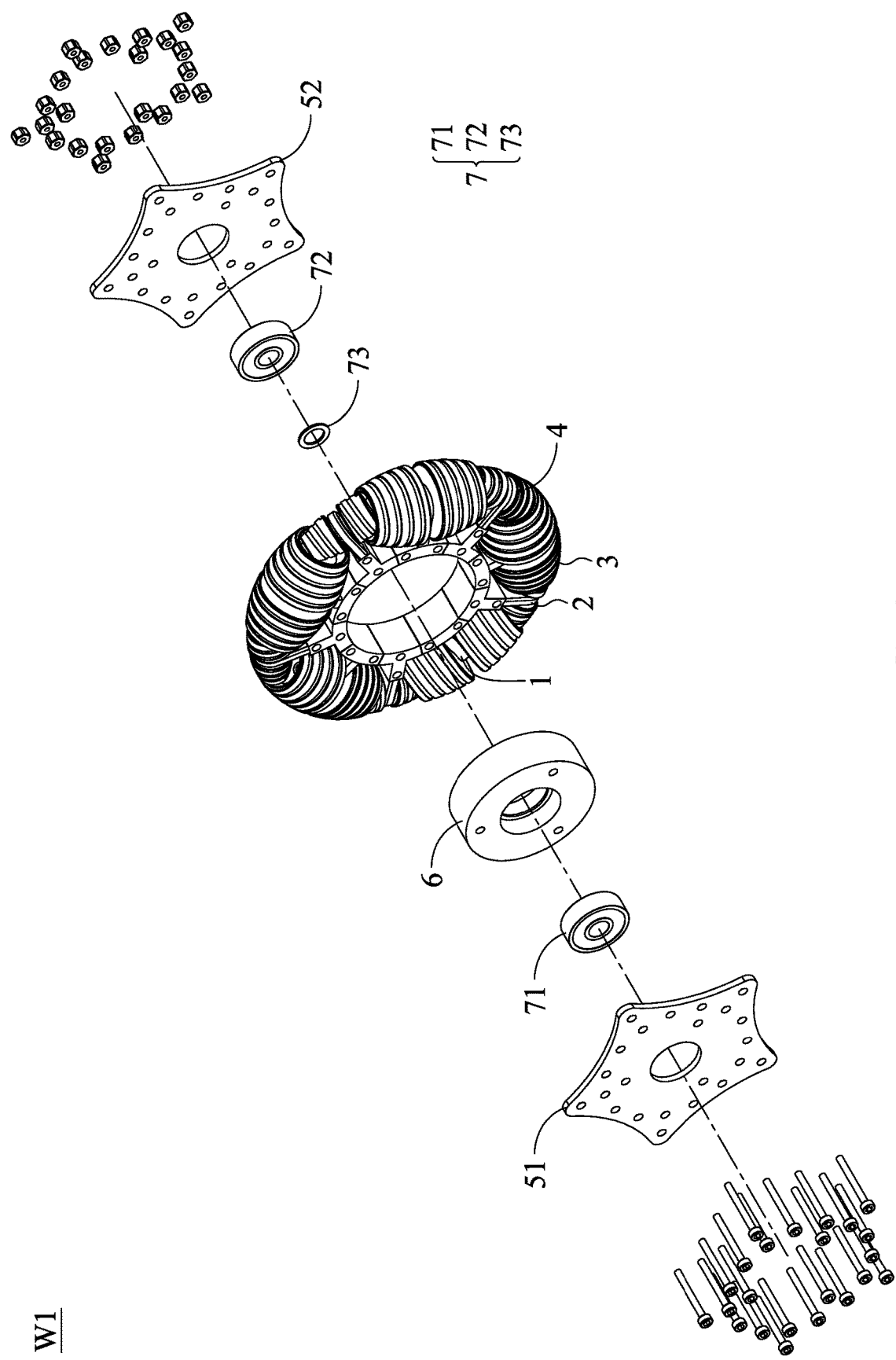
FIG. 4 is an exploded view of the omnidirectional wheel of the first embodiment of the invention.

FIG. 4 is an exploded view of the omnidirectional wheel W1 of the first embodiment of the invention. With reference to FIG. 4, in one embodiment, the omnidirectional wheel W1 further includes a first fastening plate 51 and a second fastening plate 52. The major brackets 1 and the minor brackets 2 are affixed between the first fastening plate 51 and the second fastening plate 52.

With reference to FIG. 4, in one embodiment, the omnidirectional wheel W1 further includes a cushion element 6 and a bearing unit 7. The cushion element 6 is telescoped around the bearing unit 7. The major brackets 1 and the minor brackets 2 surround and abut the cushion element 6.

With reference to FIG. 4, in one embodiment, the bearing unit 7 further includes a first bearing 71, a second bearing 72 and a washer 73, and the washer 73 is sandwiched between the first bearing 71 and the second bearing 72. The bearing unit 7 smoothens the rotation of the omnidirectional wheel.

Figure 5A:
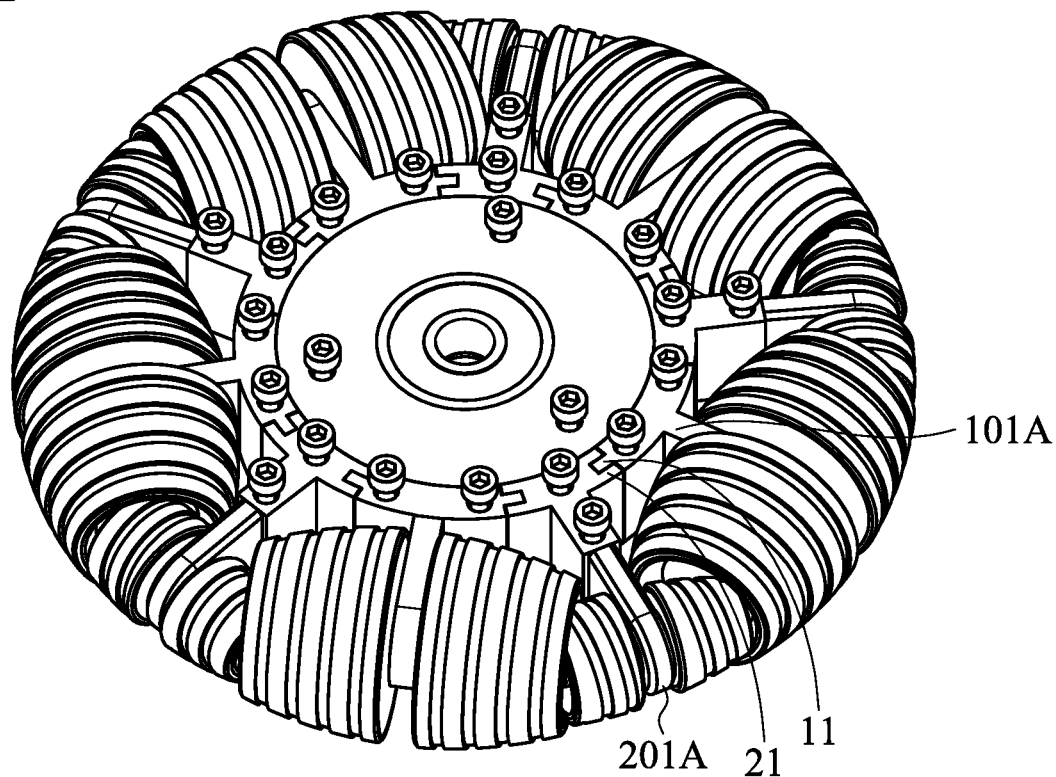
FIG. 5A shows an omnidirectional wheel of a second embodiment of the invention.

FIG. 5A shows an omnidirectional wheel W2 of a second embodiment of the invention. With reference to FIG. 5A, in one embodiment, the first major bracket 101A includes a first major bracket-wedging portion 11, and the first minor bracket 201A includes a first minor bracket-wedging portion 21. The first major bracket-wedging portion 11 wedges the first minor bracket-wedging portion 21.

With reference to FIG. 5A, in one embodiment, the first major bracket-wedging portion 11 is a protrusion, the first minor bracket-wedging portion 21 is a slot, and the first major bracket-wedging portion 11 is inserted into the first minor bracket-wedging portion 21. Via the first major bracket-wedging portion 11 and the first minor bracket-wedging portion 21, the first major bracket 101A can be firmly connected to the first minor bracket 201A.

Figure 5B:
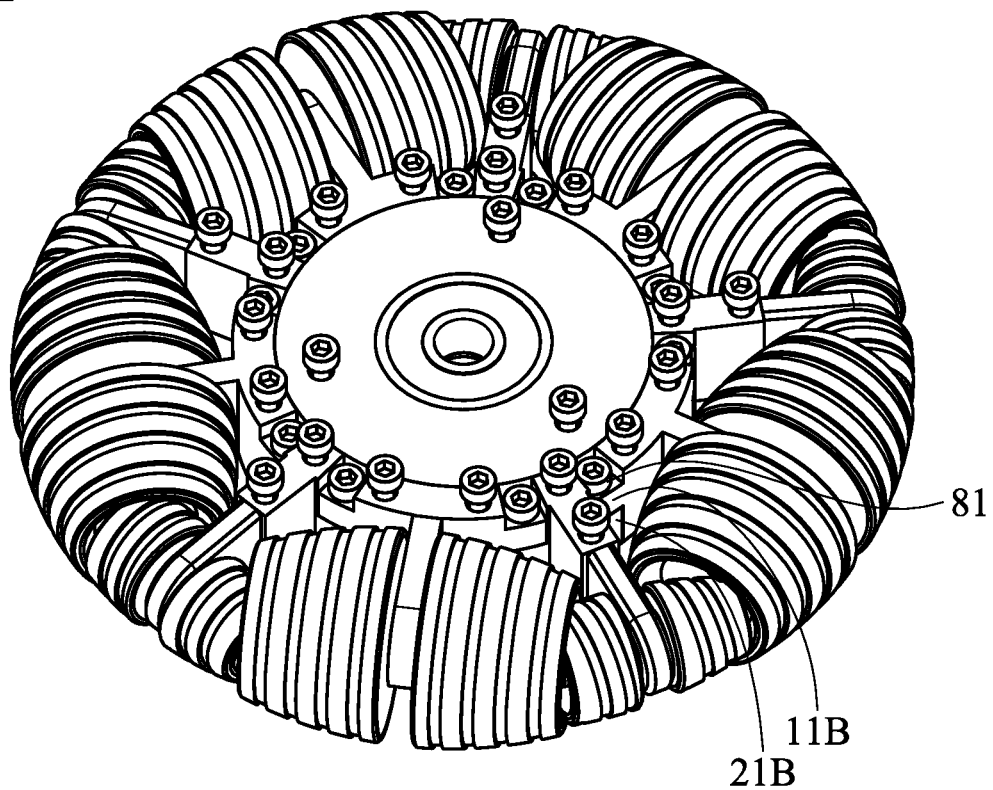
FIG. 5B shows an omnidirectional wheel of a third embodiment of the invention.

FIG. 5B shows an omnidirectional wheel W3 of a third embodiment of the invention. With reference to FIG. 5B, in one embodiment, the first major bracket-wedging portion 11B partially overlaps the first minor bracket-wedging portion 21B, the omnidirectional wheel W3 further includes a fastening bolt 81, and the fastening bolt 81 connects the first major bracket-wedging portion 11B to the first minor bracket-wedging portion 21B.

In another embodiment, a moveable carrier is provided. The moveable carrier includes a carrier body and a plurality of omnidirectional wheels connected to the carrier body. Each omnidirectional wheel includes a plurality of major brackets, a plurality of minor brackets, a plurality of major wheels and a plurality of minor wheels. The major brackets include a first major bracket. The minor brackets include a first minor bracket, wherein the major brackets and the minor brackets are arranged in a staggered manner around the omnidirectional wheel axis. The major wheels include a first major wheel, wherein the major wheels are connected to the respective major brackets, the first major wheel is connected to the first major bracket, the first major wheel is rotatable around a first axis, the first major bracket extends in a first extending direction, the first extending direction passes through the omnidirectional wheel axis, and the first axis is orthogonal to the first extending direction. The minor wheels include a first minor wheel, wherein the minor wheels are connected to the respective minor brackets, the first minor wheel is connected to the first minor bracket, the first minor wheel is rotatable around a second axis, the first minor bracket extends in a second extending direction, the second extending direction passes through the omnidirectional wheel axis, and the second axis is not orthogonal to the second extending direction. The moveable carrier can be a walker or another moveable carrier.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An omnidirectional wheel, comprising:
   a plurality of major brackets, comprising a first major bracket;
   a plurality of minor brackets, comprising a first minor bracket, wherein the major brackets and the minor brackets are arranged in a staggered manner around an omnidirectional wheel axis of the omnidirectional wheel;
   a plurality of major wheels, comprising a first major wheel, wherein the major wheels are connected to the respective major brackets, the first major wheel is connected to the first major bracket, the first major wheel is rotatable around a first axis, the first major bracket extends in a first extending direction, the first extending direction passes through the omnidirectional wheel axis, and the first axis is orthogonal to the first extending direction; and
   a plurality of minor wheels, comprising a first minor wheel, wherein the minor wheels are connected to the respective minor brackets, the first minor wheel is connected to the first minor bracket, the first minor wheel is rotatable around a second axis, the first minor bracket extends in a second extending direction, the second extending direction passes through the omnidirectional wheel axis, and the second axis is not orthogonal to the second extending direction.

2. The omnidirectional wheel as claimed in claim 1, wherein the first minor wheel comprises a first minor wheel section and a second minor wheel section, the first minor wheel section is located on one side of the first minor bracket, the second minor wheel section is located on the other end of the first minor bracket, and the shape of the first minor wheel section differs from the shape of the second minor wheel section.

3. The omnidirectional wheel as claimed in claim 2, wherein the first minor wheel section comprises a first minor wheel section minimum end, the second minor wheel section comprises a second minor wheel section minimum end, the first minor wheel section minimum end comprises a first end radius, the second minor wheel section minimum end comprises a second end radius, and the first end radius is smaller than the second end radius.

4. The omnidirectional wheel as claimed in claim 3, wherein the second minor wheel section minimum end is closer to the omnidirectional wheel axis relative to the first minor wheel section minimum end.

5. The omnidirectional wheel as claimed in claim 2, wherein the first minor wheel further comprises a first shaft, and the first minor wheel section and the second minor wheel section pivot on the first minor bracket via the first shaft.

6. The omnidirectional wheel as claimed in claim 5, wherein the first shaft comprises a screw seat, a gasket and a bolt, the screw seat passes through the first minor wheel section, the first minor bracket and the second minor wheel section, and the bolt passes through the gasket and the second minor wheel section to be affixed to the screw seat.

7. The omnidirectional wheel as claimed in claim 2, wherein the major wheels comprise a second major wheel, the major brackets comprise a second major bracket, the second major wheel is connected to the second major bracket, the first major wheel comprises a first recess, the second major wheel comprises a second recess, a portion of the first minor wheel section is located in the first recess, and a portion of the second minor wheel section is located in the second recess.

8. The omnidirectional wheel as claimed in claim 1, wherein each major wheel has major wheel treads formed on a surface of the major wheel, and each minor wheel has minor wheel treads formed on a surface of the minor wheel.

9. The omnidirectional wheel as claimed in claim 1, further comprising:
   a first fastening plate;
   a second fastening plate, wherein the major brackets and the minor brackets are affixed between the first fastening plate and the second fastening plate.

10. The omnidirectional wheel as claimed in claim 9, further comprising a cushion element and a bearing unit, wherein the cushion element is telescoped around the bearing unit, and the major brackets and the minor brackets surround and abut the cushion element.

11. The omnidirectional wheel as claimed in claim 9, wherein the bearing unit further comprises a first bearing, a second bearing and a washer, and the washer is sandwiched between the first bearing and the second bearing.

12. The omnidirectional wheel as claimed in claim 1, wherein the first major bracket comprises a first major bracket-wedging portion, the first minor bracket comprises a first minor bracket-wedging portion, and the first major bracket-wedging portion wedges the first minor bracket-wedging portion.

13. The omnidirectional wheel as claimed in claim 12, wherein the first major bracket-wedging portion is a protrusion, the first minor bracket-wedging portion is a slot, and the first major bracket-wedging portion is inserted into the first minor bracket-wedging portion.

14. The omnidirectional wheel as claimed in claim 12, wherein the first major bracket-wedging portion partially overlaps the first minor bracket-wedging portion, the omnidirectional wheel further comprises a fastening bolt, and the fastening bolt connects the first major bracket-wedging portion to the first minor bracket-wedging portion.

15. A moveable carrier, comprising:
  a carrier body; and
  a plurality of omnidirectional wheels, connected to the carrier body, wherein each omnidirectional wheel comprises:
    a plurality of major brackets, comprising a first major bracket;
    a plurality of minor brackets, comprising a first minor bracket, wherein the major brackets and the minor brackets are arranged in a staggered manner around an omnidirectional wheel axis of the omnidirectional wheel;
    a plurality of major wheels, comprising a first major wheel, wherein the major wheels are connected to the respective major brackets, the first major wheel is connected to the first major bracket, the first major wheel is rotatable around a first axis, the first major bracket extends in a first extending direction, the first extending direction passes through the omnidirectional wheel axis, and the first axis is orthogonal to the first extending direction; and
    a plurality of minor wheels, comprising a first minor wheel, wherein the minor wheels are connected to the respective minor brackets, the first minor wheel is connected to the first minor bracket, the first minor wheel is rotatable around a second axis, the first minor bracket extends in a second extending direction, the second extending direction passes through the omnidirectional wheel axis, and the second axis is not orthogonal to the second extending direction.

* * * * *